United States Patent
Chu et al.

(10) Patent No.: US 12,192,988 B2
(45) Date of Patent: Jan. 7, 2025

(54) DEVICE, SYSTEM, AND METHOD FOR MULTI-LINK OPERATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 337 days.

(21) Appl. No.: 17/718,979

(22) Filed: Apr. 12, 2022

(65) Prior Publication Data

US 2022/0330284 A1    Oct. 13, 2022

Related U.S. Application Data

(60) Provisional application No. 63/215,936, filed on Jun. 28, 2021, provisional application No. 63/180,053, filed on Apr. 26, 2021, provisional application No. 63/173,853, filed on Apr. 12, 2021.

(51) Int. Cl.
H04W 72/1263    (2023.01)
H04W 48/10    (2009.01)
H04W 76/10    (2018.01)

(52) U.S. Cl.
CPC ....... *H04W 72/1263* (2013.01); *H04W 48/10* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 2008/0123577 | A1* | 5/2008 | Jaakkola | H04W 52/287 370/311 |
| 2019/0200171 | A1* | 6/2019 | Huang | H04W 4/06 |
| 2019/0208462 | A1* | 7/2019 | Patil | H04W 8/26 |
| 2023/0145827 | A1* | 5/2023 | Gan | H04W 72/23 |
| 2023/0232315 | A1* | 7/2023 | Chitrakar | H04W 48/16 370/329 |

OTHER PUBLICATIONS

Gan, Ming et al. "IEEE P802.11 Wireless LANs; TBD and CR for Group addressed frames", doc.: IEEE 802.11-21/0740r1, Mar. 20, 2021, 5 pgs.

* cited by examiner

*Primary Examiner* — Hong S Cho

(57) ABSTRACT

A device, a system, and a method for multi-link operations are disclosed. In an embodiment, the device includes a processor configured to generate a frame that includes a Traffic Indication Map (TIM) element, where the TIM element includes a group-addressed buffered frame indication for reported Access Points (APs) that indicates a transmitted Basic Service Set Identifier (BSSID) AP and non-transmitted BSSID APs affiliated with the reported APs, and exchange buffered frames according to the TIM element.

19 Claims, 12 Drawing Sheets

DEVICE, SYSTEM, AND METHOD FOR MULTI-LINK OPERATIONS

CROSS-REFERENCE TO RELATED APPLICATIONS

This application is entitled to the benefit of U.S. Provisional Patent Application Ser. No. 63/173,853, filed on Apr. 12, 2021, U.S. Provisional Patent Application Ser. No. 63/180,053, filed on Apr. 26, 2021, and U.S. Provisional Patent Application Ser. No. 63/215,936, filed on Jun. 28, 2021, each of which is incorporated by reference herein.

BACKGROUND

In multi-link operations, wireless devices, e.g., multi-link devices (MLDs), can execute various wireless operations, such as coordinate some features or operations for devices in a multi-link operation via one or more links. As an example, an Access Point (AP) of an AP MLD may include a Traffic Indication Map (TIM) element in a frame to share information related to the AP, related to other APs (e.g., reported APs), and/or related to associated stations (STAs). However, conventional TIM elements may cause high overhead as a result of inefficient organization of a Partial Virtual Bitmap. As such, the high overhead of the conventional TIM elements may cause wireless devices to experience performance degradation and inefficient medium time usage.

SUMMARY

A device, a system, and a method for multi-link operations are disclosed. In an embodiment, the device includes a processor configured to generate a frame that includes a Traffic Indication Map (TIM) element, where the TIM element includes a group-addressed buffered frame indication for reported Access Points (APs) that indicates a transmitted Basic Service Set Identifier (BSSID) AP and non-transmitted BSSID APs affiliated with the reported APs, and exchange buffered frames according to the TIM element.

In an embodiment, a bitmap per BSSID Index included in a Multi-Link Information Element (IE) indicates whether the TIM element includes the group-addressed buffered frame indication for the reported APs with a non-transmitted BSSID Index, and where bitmaps of AP Multi-Link Devices (MLDs) have a same length that is indicated in the Multi-Link IE.

In an embodiment, the bitmap per BSSID Index is included in a Common Info field of the Multi-Link IE, and where the length is indicated in a Multi-Link Control field of the Multi-Link IE.

In an embodiment, a length of bitmaps included in the group-addressed buffered frame indication is indicated in a Multi-Link Control field of a Multi-Link IE.

In an embodiment, a bitmap of the group-addressed buffered frame indication is after a bitmap of an individual-addressed buffered frame indication.

In an embodiment, an ending of the bitmap of the individual-addressed buffered frame indication is indicated by an N2 field, and where non-AP MLDs with an Association Identifier (AID) value related to a bit at a location more than (N2+1)*8 do not have bits for individual-addressed buffered frame indications.

In an embodiment, a bitmap of the group-addressed buffered frame indication for a non-transmitted BSSID AP with a BSSID Index is excluded from a Partial Virtual Bitmap field of the TIM element if at least one of the bitmap includes all zero bits, the BSSID Index does not correspond to the non-transmitted BSSID, and the bitmap related to the BSSID Index has zero bits for a larger BSSID Index.

In an embodiment, a bitmap per BSSID Index included in the TIM element indicates whether the TIM element includes the group-addressed buffered frame indication for the reported APs with a non-transmitted BSSID Index, and where bitmaps of AP MLDs have a same length that is indicated in a Multi-Link IE.

In an embodiment, a non-AP MLD ignores the group-addressed buffered frame indication from a Partial Virtual Bitmap field of the TIM element if at least one of the reported APs that Stations (STAs) of the non-AP MLD are associated with do not have the buffered frames and a Bitmap Offset subfield, the Bitmap Offset subfield and a Length field describe the ignoring, AIDs of the reported APs are smaller than a smallest AID value described by the Partial Virtual Bitmap field, and AIDs of the reported APs are larger than a largest AID value described by the Partial Virtual Bitmap field.

In an embodiment, the device allocates smaller AID values to STAs that do not support multi-link operation than AID values allocated to other STAs affiliated with non-AP MLDs.

In an embodiment, an AID value of the reported APs is announced in a Multi-Link IE of Beacon frames.

In an embodiment, when the device establishes a multi-link association with a non-AP MLD, the device announces an AID value for APs with which the non-AP MLD establishes a connection.

In an embodiment, the frame includes a Multi-link Traffic IE that indicates Traffic Identifiers (TIDs) mapped to different links.

In an embodiment, the frame includes a Multi-link Traffic IE if at least one associated non-AP MLD with negotiated TID-to-link mapping is associated with the device, and the device has the buffered frames for the non-AP MLD, and where the Multi-Link Traffic IE is included in a Beacon frame and in a Broadcast frame if transmitted by an AP of the at least one associated non-AP MLD.

In an embodiment, the frame includes a Multi-link Traffic IE if at least one associated non-AP MLD with negotiated TID-to-link mapping is associated with the device, where different TIDs are mapped to the different links, and the device has the buffered frames for the non-AP MLD, and where the Multi-Link Traffic IE is included in a Beacon frame and in a broadcast frame if transmitted by an AP of the at least one associated non-AP MLD.

In an embodiment, the frame optionally includes a Multi-link Traffic IE if at least one associated non-AP MLD with negotiated TID-to-link mapping is associated with the device, where different TIDs are mapped to the different links, and the device does not have the buffered frames for the non-AP MLD, and where the Multi-Link Traffic IE is optionally included in a Beacon frame and in a broadcast frame if transmitted by an AP of the at least one associated non-AP MLD.

In an embodiment, the frame includes a Multi-link Traffic IE that indicates, for each non-AP MLD with negotiated TID-to-link mapping, links that include the buffered frames.

In an embodiment, the frame includes a Multi-link Traffic IE that includes a link ID bitmap when a link bitmap has a length different from sixteen, and where the link ID bitmap includes a first bit that corresponds to a link that has an AP with a smallest link ID value, a last bit that corresponds to another link that has another AP with a largest link ID value, a link ID value that is related to a bit that is less than another link ID value related to another bit that is after the bit, and if a number of bits in the link ID bitmap is more than a number of links of the device, then least significant bit (LSB) bits related to the number of the links with APs of the device are used.

A system for multi-link operations is also disclosed. In an embodiment, the system includes a first MLD, where the first MLD includes a processor configured to generate a frame that includes a TIM element, where the TIM element includes a group-addressed buffered frame indication for reported APs that indicates a transmitted BSSID AP and non-transmitted BSSID APs affiliated with the reported APs, a radio configured to transmit the frame that includes the TIM element, and a second MLD, where the second MLD includes another radio configured to receive the frame that includes the TIM element.

A method for multi-link operations is also disclosed. In an embodiment, the method includes transmitting, by a wireless device, a frame that includes a TIM element, where the TIM element includes a group-addressed buffered frame indication for reported APs that indicates a transmitted BSSID AP and non-transmitted BSSID APs affiliated with the reported APs, and exchanging, by the wireless device, buffered frames according to the TIM element.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
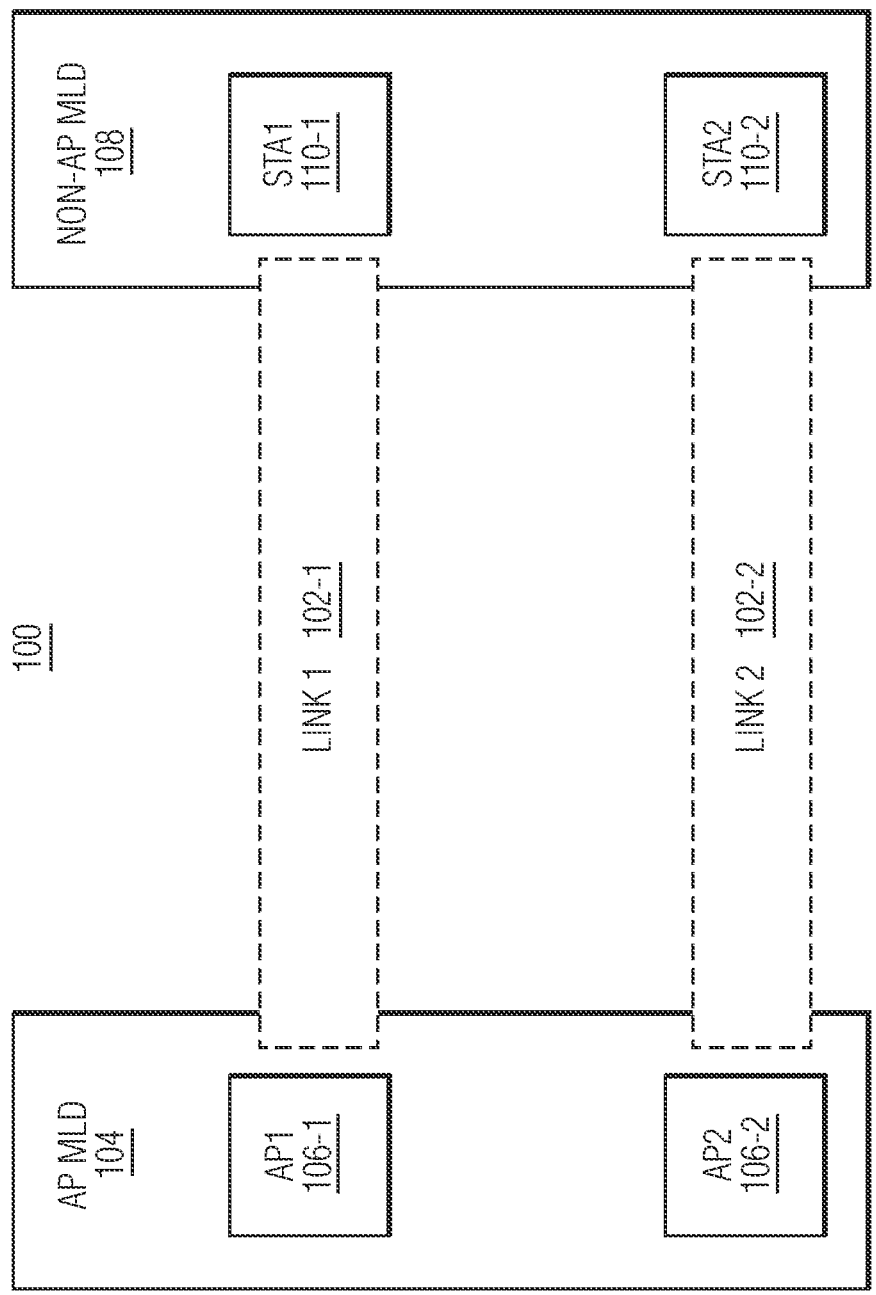
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a wireless device, e.g., an access point (AP) multi-link device (MLD) of a wireless local area network (WLAN) may exchange data with at least one associated non-Access Point (non-AP) MLD (e.g., a station (STA) MLD). In such an embodiment, the AP MLD may include one or more associated access points (APs) and the non-AP MLD may include one or more associated stations (STAs). The AP MLD may be configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communications systems operating in accordance with the EHT communication protocol and/or next-generation communication protocols may be referred to herein as "non-legacy" features. In some embodiments of the multi-link communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a multi-link communications system 100 that is used for wireless (e.g., Wi-Fi) communications. In the embodiment depicted in FIG. 1, the multi-link communications system includes one AP MLD, implemented as AP MLD 104, and one non-AP MLD (e.g., STA MLD), implemented as non-AP MLD 108. In an embodiment, the AP MLD 104 may be a first MLD, and the non-AP MLD 108 may be a second MLD. The multi-link communications system can be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple non-AP MLDs, or multiple AP MLDs with more than one non-AP MLD. In another example, although the multi-link communications system is shown in FIG. 1 as being connected in a certain topology, the network topology of the multi-link communications system is not limited to the topology shown in FIG. 1.

In the embodiment depicted in FIG. 1, the AP MLD 104 includes two radios, AP1 106-1 and AP2 106-2. In some embodiments, a common part of the AP MLD 104 implements upper layer Media Access Control (MAC) functionalities (e.g., Beacon creation, MLD association establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the IEEE 802.11be protocol.

In some embodiments, an AP MLD (e.g., AP MLD 104) connects to a local area network (e.g., a Local Area Network (LAN)) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 megahertz (MHz) BSS operating channel at 6 gigahertz (GHz) band and AP2 106-2 may operate in a 160 MHz BSS operating channel at 5 GHz band. Although the AP MLD 104 is shown in FIG. 1 as including two APs, other embodiments of the AP MLD 104 may include more than two APs or less than two APs.

In the embodiment depicted in FIG. 1, the non-AP MLD, implemented as non-AP MLD 108, includes two STAs (e.g., non-AP STAs), STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the STAs 110-1 and 110-2 are part of the non-AP MLD 108, such that the non-AP MLD may be a communications device that wirelessly connects to a wireless AP MLD. For example, the non-AP MLD 108 may be implemented in a laptop, a desktop personal computer (PC), a mobile phone, or other communications device that supports at least one WLAN communications protocol. In some embodiments, the non-AP MLD 108 is a communications device compatible with at least one IEEE 802.11 protocol (e.g., the IEEE 802.11be protocol). In some embodiments, the non-AP MLD 108 implements a common MAC data service interface and the STAs 110-1 and 110-2 implement a lower layer MAC data service interface.

In some embodiments, the AP MLD 104 and/or the non-AP MLD 108 can identify which communication links support multi-link operation during a multi-link operation setup phase and/or exchanges information regarding multi-link capabilities during the multi-link operation setup phase. In some embodiments, each of the STAs 110-1 and 110-2 of the non-AP MLD 108 may operate in a different frequency band. For example, STA1 110-1 may operate in the 2.4 GHz frequency band and STA2 110-2 may operate in the 5 GHz frequency band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the non-AP MLD 108 communicates with the AP MLD 104 via two communication links, e.g., link 1 102-1 and link 2 102-2. For example, each of the STAs 110-1 or 110-2 communicates with AP1 106-1 or AP2 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames in Physical Layer Convergence Protocol (PLCP) Protocol Data Units (PPDUs) (e.g., Date frames, Control frames, Management frames, Beacon frames, Action frames, etc.) between an AP MLD and a non-AP MLD. In some embodiments, a 20 MHz channel may be a punctured 20 MHz channel or an unpunctured 20 MHz channel. Although the non-AP MLD 108 is shown in FIG. 1 as including two STAs, other embodiments of the non-AP MLD 108 may include one STA or more than two STAs. In addition, although the AP MLD 104 communicates (e.g., wirelessly communicates) with the non-AP MLD 108 via multiple links 102-1 and 102-2, in other embodiments, the AP MLD 104 may communicate (e.g., wirelessly communicate) with the non-AP MLD 108 via more than two communication links or less than two communication links.

In conventional multi-link operations, an AP of an AP MLD transmits a frame (e.g., a Beacon frame, a Control frame, or other Management frame) that includes a Traffic Indication Map (TIM) element to indicate whether there are buffered group-addressed frames in reporting AP(s) of a reporting link (e.g., a link where a Beacon frame is transmitted) and in AP(s) (e.g., reported AP(s)) affiliated with a same AP MLD(s) as the reporting AP(s), and whether there are buffered individual-addressed frames in the AP MLDs. The AP of the AP MLD may include bitmaps in a Partial Virtual Bitmap field of a conventional TIM element as described herein. In an embodiment, the Partial Virtual Bitmap field includes a bitmap for an indication of buffered group-addressed frames (sometimes referred to herein as a "group-addressed buffered frame indication") of the AP and non-transmitted Basic Service Set Identifiers (BSSIDs) if the AP has a transmitted BSSID. In an embodiment, the Partial Virtual Bitmap field includes a bitmap for an indication of buffered group-addressed frames of APs affiliated with the same AP MLD as a transmitted BSSID AP, and APs affiliated with a same AP MLD(s) as APs with non-transmitted BSSIDs. In an embodiment, the Partial Virtual Bitmap field includes a bitmap for an indication of buffered individual-addressed frames (sometimes referred to herein as an "individual-addressed buffered frame indication") of associated MLDs and STAs not affiliated with (any) MLDs. An example of a conventional TIM element and a Bitmap Control field are described in further detail with reference to FIGS. 2A and 2B, respectively.

Figure 2A:
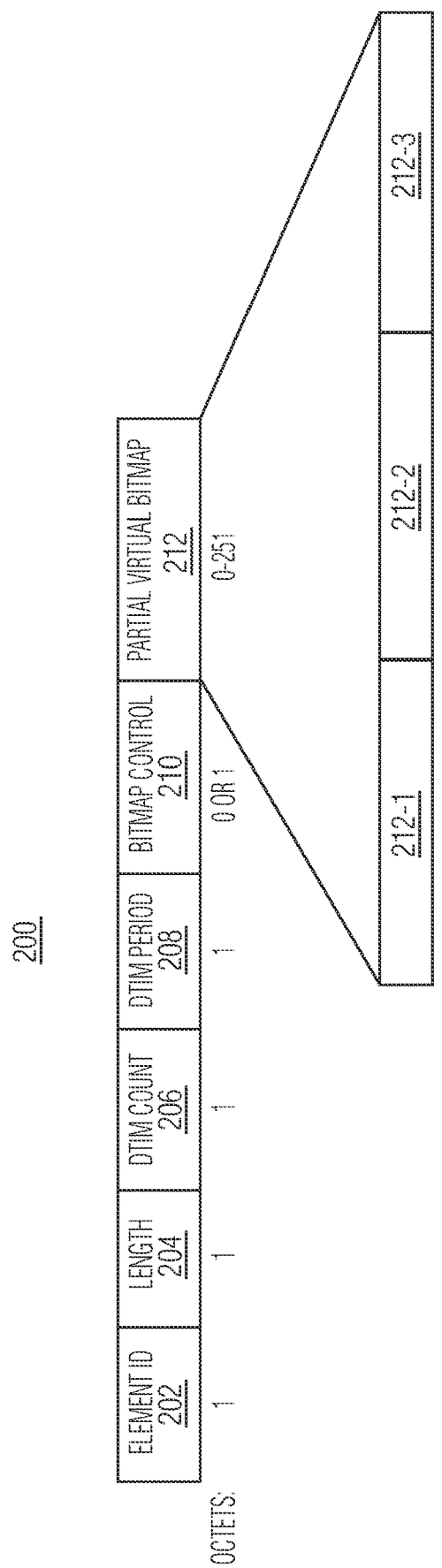
FIG. 2A depicts a conventional Traffic Indication Map (TIM) element.

FIG. 2A depicts a conventional TIM element 200. In the embodiment of FIG. 2A, the conventional TIM element 200 includes six fields, implemented as an Element Identification (ID) field 202 (1 octet), a Length field 204 (1 octet), a Delivery TIM (DTIM) Count field 206 (1 octet), a DTIM Period field 208 (1 octet), a Bitmap Control field 210 (0 or 1 octet), and a Partial Virtual Bitmap field 212 (0-251 octets). The Partial Virtual Bitmap field 212 may include three subfields implemented as a first subfield 212-1, a second subfield 212-2, and a third subfield 212-3. In some embodiments, the first subfield 212-1 includes a group-addressed buffered frame indication for multiple BSSIDs (e.g., an AP with a transmitted BSSID and APs with non-transmitted BSSIDs in one multiple BSSID AP set, i.e., defined by one Multiple BSSID element and an AP that transmits the Multiple BSSID element), the second subfield 212-2 includes a group-addressed buffered frame indication for other link APs of AP MLDs (e.g., reported APs), and the third subfield 212-3 includes an individual-addressed buffered frame indication for associated STAs.

Figure 2B:
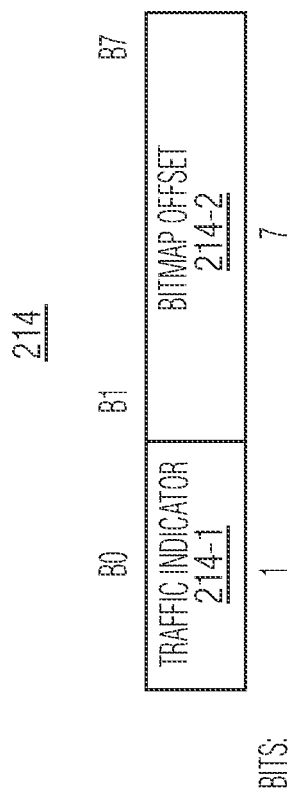
FIG. 2B depicts a Bitmap Control field.

FIG. 2B depicts a Bitmap Control field 214. The Bitmap Control field 214 can represent the Bitmap Control field 210 of the conventional TIM element 200 of FIG. 2A. In the embodiment of FIG. 2B, the Bitmap Control field 214 includes two subfields implemented as a Traffic Indicator subfield 214-1 (1 bit) and a Bitmap Offset subfield 214-2 (7 bits).

In some embodiments, bitmaps, group-addressed buffered frame indications, and/or individual-addressed buffered frame indications included in conventional TIM elements (e.g., conventional TIM element 200) may cause high overhead as a result of inefficient organization of a Partial Virtual Bitmap. Consequently, the high overhead of the conventional TIM elements may cause wireless devices (e.g., APs, AP MLDs, non-APs, and/or non-AP MLDs) to experience performance degradation and inefficient medium time usage.

In accordance with an embodiment of the invention, a technique for multi-link operations involves transmitting, by a wireless device, a frame that includes a TIM element, wherein the TIM element includes a group-addressed buffered frame indication for reported APs that indicates a transmitted BSSID AP and non-transmitted BSSID APs affiliated with the reported APs, and exchanging, by the wireless device, buffered frames according to the TIM element. As an example, the wireless device may be an AP, an AP MLD, a non-AP STA, or a non-AP STA MLD. By including the group-addressed buffered frame indication for reported APs that are affiliated with a same AP MLD(s) as reporting AP(s) (e.g., the AP without supporting Multiple BSSID or the transmitted BSSID AP and the non-transmitted BSSID APs that are in a same Multiple BSSID set) in a location other than before (e.g., preceding, prior to, previous, etc.) a bitmap to indicate buffered individual-addressed frames of associated non-AP MLDs and/or non-EHT STAB, overhead of the TIM element may be reduced. As such, multi-link operations may be performed more efficiently, and wireless devices may experience an improvement of performance.

In some embodiments, a device (e.g., an AP (e.g., AP1 106-1) of an AP MLD (e.g., AP MLD 104)) transmits a frame that includes a TIM element to another device (e.g., a non-AP STA (e.g., STA1) of a non-AP STA MLD (e.g., non-AP MLD 108)). The TIM element may include information (e.g., a group-addressed buffered frame indication and/or an individual-addressed buffered frame indication) related to other APs. As described herein, an AP (e.g., a transmitted BSSID AP) that transmits a frame and optionally, APs (if existing) that are in a same multiple BSSID set as the AP, may be referred to as a "reporting AP", and other APs affiliated with a same AP MLD as the reporting AP whose information is included in the frame may be referred to as "reported APs". A reporting AP may be, for example, a transmitted BSSID AP or a non-transmitted BSSID AP. As described herein, a "transmitted BSSID AP" may be an AP that has a transmitted BSSID and that transmits a Beacon frame, and a "non-transmitted BSSID AP" may be an AP that is in the same multiple BSSID set as the transmitted BSSID.

In some embodiments, a bitmap of group-addressed buffered frame indications of APs affiliated with a same AP MLD as a reporting AP without supporting Multiple BSSID or with the same AP MLDs as reporting APs (e.g., a transmitted BSSID AP and non-transmitted BSSID APs in the same multiple BSSID AP set) are placed after a bitmap for individual-addressed buffered frame indications. As described herein, "after" may imply being behind, subsequent to, succeeding, or following. In some embodiments, an ending of a bitmap for individual-addressed buffered frame indications may be clearly indicated, for example, by a field and/or bit(s) included in a Multi-Link Information Element (IE) and/or in a TIM element. In some embodiments, a bitmap may be used to indicate whether group-addressed buffered frame indications for reported APs of an AP MLD exist. Examples of TIM elements that feature the bitmap of group-addressed buffered frame indications after the bitmap for individual-addressed buffered frame indications, an indication of the end of the bitmap for individual-addressed buffered frame indications, and/or the bitmap for indicating whether group-addressed buffered frame indications for APs of an AP MLD exist are described in further detail with reference to FIGS. 3A-3C.

Figure 3A:
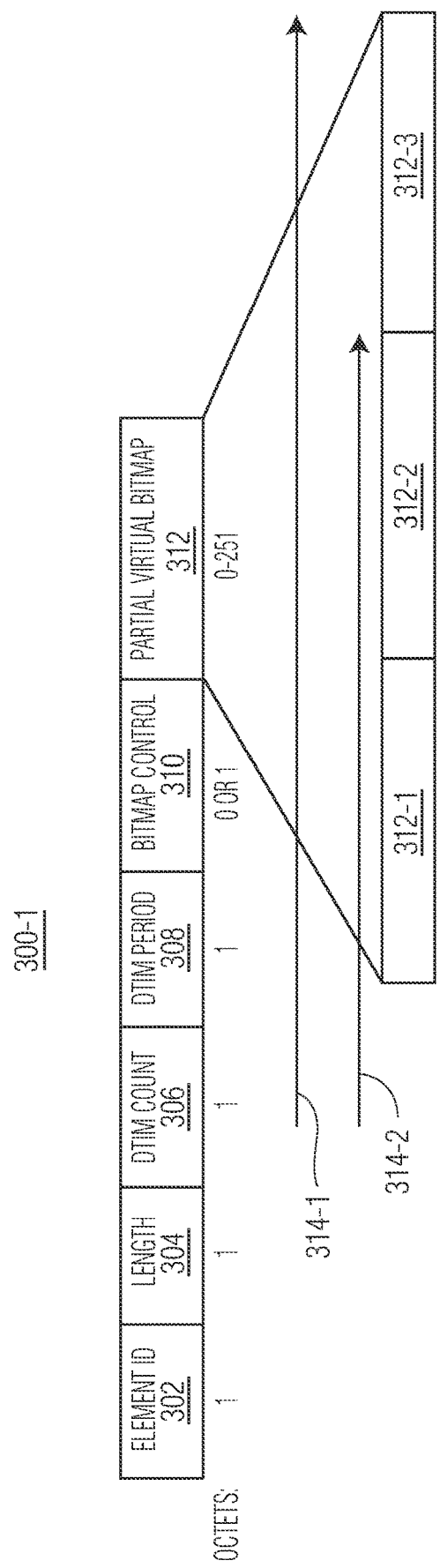
FIG. 3A depicts a TIM element.

FIG. 3A depicts a TIM element 300-1. In the embodiment of FIG. 3A, the TIM element 300-1 includes six fields, implemented as an Element ID field 302 (1 octet), a Length field 304 (1 octet), a DTIM Count field 306 (1 octet), a DTIM Period field 308 (1 octet), a Bitmap Control field 310 (0 or 1 octet), and a Partial Virtual Bitmap field 312 (0-251 octets). The Partial Virtual Bitmap field 312 may include three subfields implemented as a first subfield 312-1, a second subfield 312-2, and a third subfield 312-3. In some embodiments, the first subfield 312-1 includes a group-addressed buffered frame indication for multiple BSSIDs, the second subfield 312-2 includes an individual-addressed buffered frame indication for associated STAs not affiliated with non-AP MLDs and for non-AP MLDs, and the third subfield 312-3 includes a buffered group-addressed frame indication for reported APs.

An ending of the subfields included in the Partial Virtual Bitmap field 312 (shown by arrow 314-1) may be indicated by the Length field 304 of the TIM element 300-1. In addition, an ending of a bitmap of the individual-addressed buffered frame indication (shown by arrow 314-2) may be indicated by an 8-bit Legacy Length field (e.g., an 8-bit field included in a Common Info field of a Multi-Link IE), where bits that are not covered by the Legacy Length field carry a buffered group-addressed frame indication for reported APs affiliated with the same AP MLD(s) as reporting AP(s).

Although not shown in FIG. 3A, in some embodiments, a new defined Enhanced TIM element (with a new Element ID and Extended Element ID) may be defined to carry a buffered group-addressed frame indication for reported APs affiliated with the same AP MLD(s) as the reporting AP(s). In some embodiments, a new defined Enhanced TIM element (with a new Element ID and an Extended Element ID) may be defined to carry the buffered individual-addressed frame indication for non-AP MLDs and the buffered group-addressed frame indication for reported APs affiliated with the same AP MLD(s) as the reporting AP(s). In some embodiments, AIDs allocated to STAs that do not support EHT features are less than AIDs allocated to non-AP MLDs.

Figure 3B:
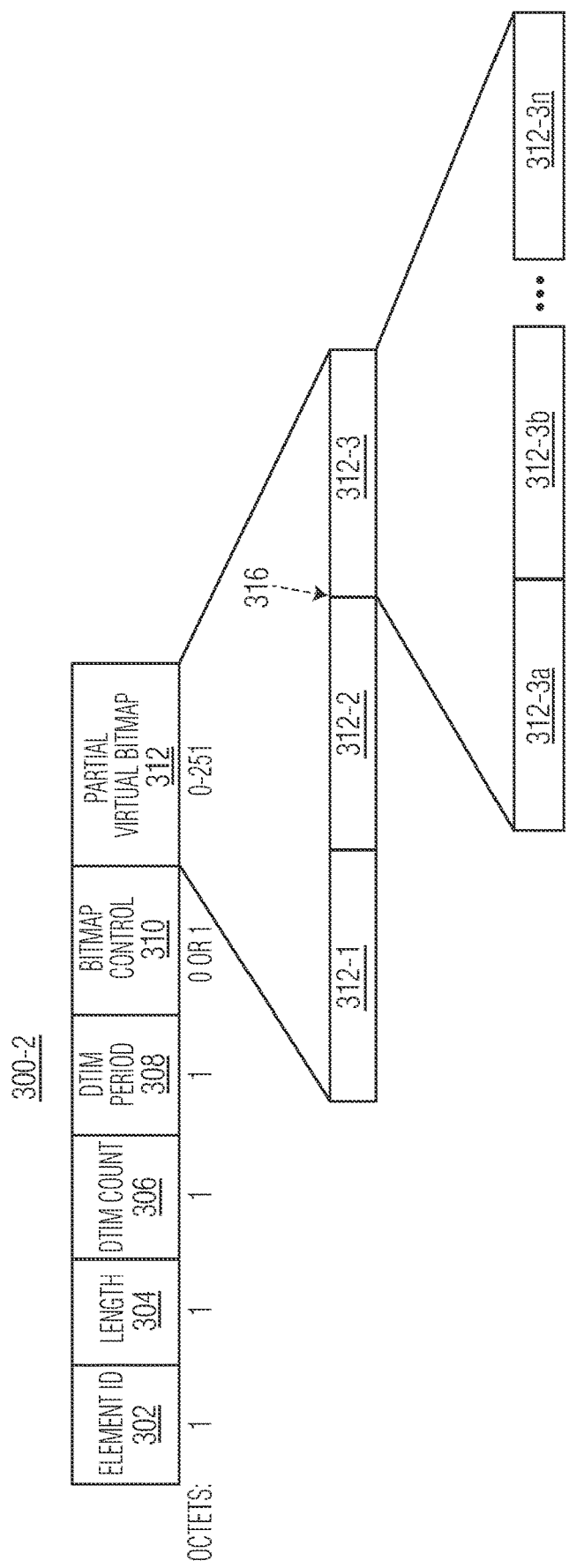
FIG. 3B depicts another TIM element.

FIG. 3B depicts another TIM element 300-2. The TIM element 300-2 includes the Element ID field 302 (1 octet), the Length field 304 (1 octet), the DTIM Count field 306 (1 octet), the DTIM Period field 308 (1 octet), the Bitmap Control field 310 (0 or 1 octet), and the Partial Virtual Bitmap field 312 (0-251 octets) that may include the first subfield 312-1, the second subfield 312-2, and the third subfield 312-3 as described with reference to FIG. 3A.

In contrast to FIG. 3A, the first subfield 312-1 includes a group-addressed buffered frame indication for multiple BSSIDs, the second subfield 312-2 includes an individual-addressed buffered frame indication for associated STAs and non-AP MLDs, and the third subfield 312-3 includes a group-addressed buffered frame indication for reported APs of AP MLDs. Additionally, the TIM element 300-2 of FIG. 3B includes at least two indications in the third subfield 312-3 implemented as a first indication 312-3a, a second indication 312-3b, and an $n^{th}$ indication 312-3n (n is an integer greater than one) that may include bitmaps. In some embodiments, bitmaps of AP MLDs included in the indications 312-3a, 312-3b, and/or 312-3n may have a same length that is indicated, for example, in a Multi-Link IE.

In some embodiments, the first indication 312-3a includes a group-addressed buffered frame indication for reported APs of an AP MLD with which a transmitted BSSID AP is affiliated. In some embodiments, the second indication 312-3b includes a group-addressed buffered frame indication for reported APs of an AP MLD with which an AP with a non-transmitted BSSID Index of one is affiliated. In some embodiments, the $n^{th}$ indication 312-3n includes a group-addressed buffered frame indication for reported APs of an AP MLD with which an AP with a non-transmitted BSSID Index of N is affiliated (N is an integer greater than one). In such embodiments, a bitmap of the group-addressed buffered frame indication for the reported APs with the same AP MLDs as the transmitted BSSID AP (e.g., included in the first indication 312-3a) and bitmap(s) of the group-addressed buffered frame indication for the reported APs of the AP MLD with which the AP with the non-transmitted BSSID Index (e.g., included in the second indication 312-3b and/or the $n^{th}$ indication 312-3n) are after (e.g., subsequent to) a bitmap of the individual-addressed buffered frame indication for the associated STAs and non-AP MLDs that is included in the second subfield 312-2.

The TIM element 300-2 may also include an indication 316 that indicates an ending of a bitmap of the individual-addressed buffered frame indication included in the second subfield 312-2. In an embodiment, the indication 316 may or may not be included in the TIM element 300-2. In an embodiment, the ending of the bitmap may be indicated by an N2 field (e.g., an 8-bit field included in a Common Info field of a Multi-Link IE), where non-AP MLDs with an AID value related to a bit at a location more than (N2+1)*8 do not have bits for individual-addressed buffered frame indications (at least for non-EHT STAs). In such embodiments, one restriction may be that (all) associated STAs that do not support multi-link operation have an AID value of less than (N2+1)*8. For example, if a bit of a buffered group-addressed frame indication related to a reported AP is not included in a Partial Virtual Bitmap field, then there are no buffered group-addressed frames in the reported AP.

Figure 3C:
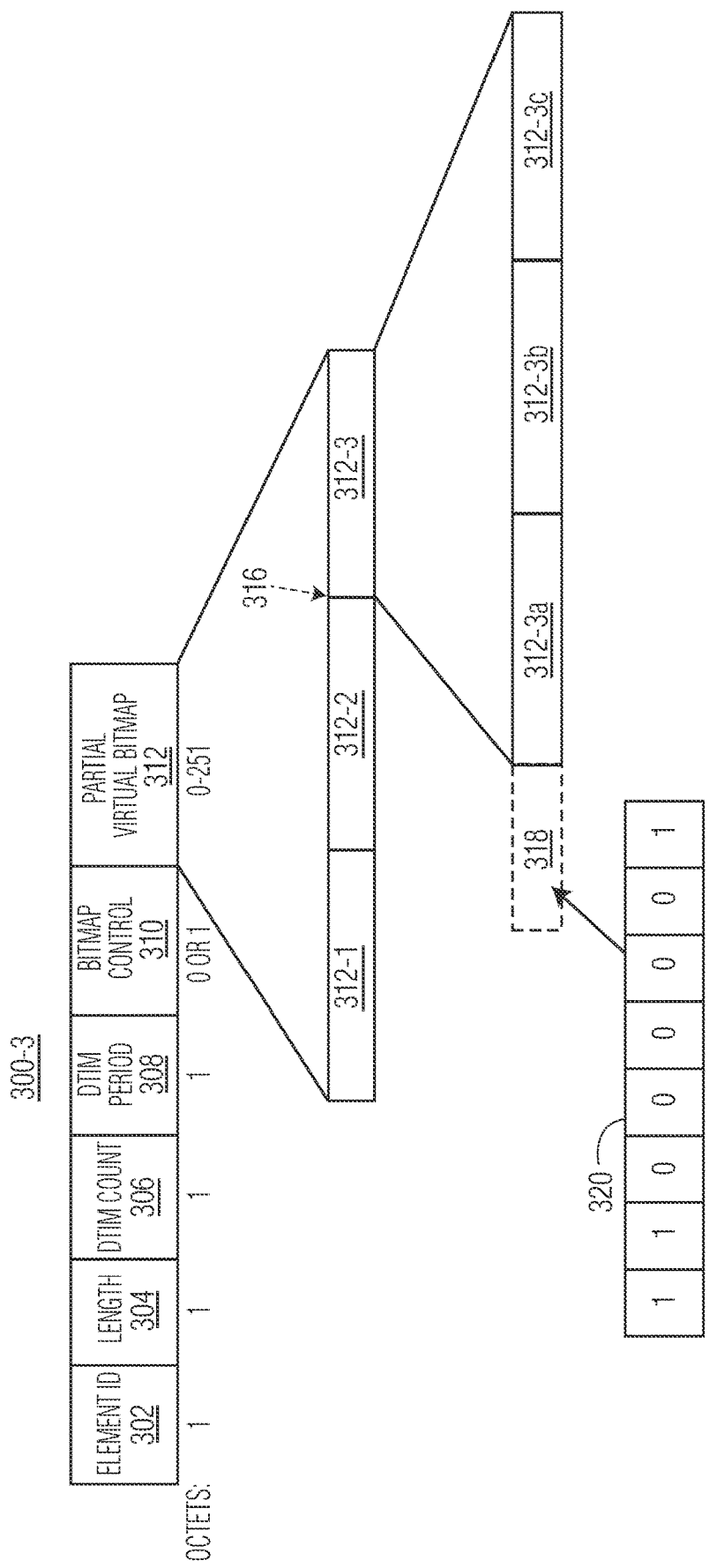
FIG. 3C depicts another TIM element.

FIG. 3C depicts another TIM element 300-3. The TIM element 300-3 includes the Element ID field 302 (1 octet), the Length field 304 (1 octet), the DTIM Count field 306 (1 octet), the DTIM Period field 308 (1 octet), the Bitmap Control field 310 (0 or 1 octet), and the Partial Virtual Bitmap field 312 (0-251 octets) that includes the first subfield 312-1, the second subfield 312-2, and the third subfield 312-3, and the indication 316 as described with reference to FIG. 3B.

In contrast to FIG. 3B, the TIM element 300-3 of FIG. 3C includes at least three indications in the third subfield 312-3 implemented as a first indication 312-3a, a second indication 312-3b, a third indication 312-3c, and an optional indication 318. In some embodiments, the optional indication 318 may include an 8-bit BSSID Index bitmap 320. In some embodiments, bitmaps of AP MLDs included in the indications 312-3a, 312-3b, and 312-3c may have a same length that is indicated, for example, in a Multi-Link IE.

In some embodiments, the first indication 312-3a includes a group-addressed buffered frame indication for reported APs of an AP MLD with which a transmitted BSSID AP is affiliated. In some embodiments, the second indication 312-3b includes a group-addressed buffered frame indication for reported APs of an AP MLD with which an AP with a non-transmitted BSSID Index of one is affiliated. In one embodiment, the third indication 312-3c includes a group-addressed buffered frame indication for reported APs of an AP MLD with which an AP with a non-transmitted BSSID Index of two is affiliated. In another embodiment, the third indication 312-3c includes a group-addressed buffered frame indication for reported APs of an AP MLD with which an AP with a non-transmitted BSSID Index of seven is affiliated. In such embodiments, a bitmap of the group-addressed buffered frame indication for the reported APs of a non-transmitted BSSID AP with a BSSID Index can be excluded from the Partial Virtual Bitmap field 312 if the bitmap has (all) zero bits, the BSSID Index does not correspond to the non-transmitted BSSID, and/or the bitmap related to the BSSID Index has zero bits for a larger BSSID Index.

In one embodiment, the third indication 312-3c includes a group-addressed buffered frame indication for reported APs of an AP MLD with which an AP with a non-transmitted BSSID Index of two is affiliated, when a Max BSSID Indicator has a value of three (at most seven non-transmitted BSSID APs). In such an embodiment, the BSSID Indexes from three to seven have no related non-transmitted BSSID APs. As such, group-addressed buffered frame indications for reported APs of an AP MLD with which an AP with a non-transmitted BSSID Index greater than two may not be included in the TIM element 300-3.

In another embodiment, the third indication 312-3c includes a group-addressed buffered frame indication for reported APs of an AP MLD with which an AP with a non-transmitted BSSID Index of seven is affiliated, when a Max BSSID Indicator has a value of seven. As such, group-addressed buffered frame indications for reported APs of an AP MLD with which APs with a non-transmitted BSSID Index from one to seven may be included in the TIM element 300-3.

In some embodiments, the bitmap per BSSID Index 320 included in the optional indication 318 indicates whether the TIM element 300-3 includes a group-addressed buffered frame indication for reported APs with a non-transmitted BSSID Index. In such an embodiment, bits included in the optional indication 318 may be decided by $2^n$, where n is a value from a Max BSSID Indicator and is a positive integer. In another embodiment, the bitmap per BSSID Index 320 that indicates whether the TIM element 300-3 includes a group-addressed buffered frame indication for reported APs with a non-transmitted BSSID Index is included in a Multi-Link IE (and the TIM element 300-3 does not include the optional indication 318). In such an embodiment, bitmaps (e.g., bitmaps included in the indications 312-3a, 312-3b, and 312-3c) of AP MLDs have a same length that is indicated in the Multi-Link IE. As an example, the bitmap per BSSID Index is included in a Common Info field of the Multi-Link IE, and the length is indicated in a Multi-Link Control field of the Multi-Link IE. An example of a Multi-Link IE is described in further detail with reference to FIG. 4A.

Figure 4A:
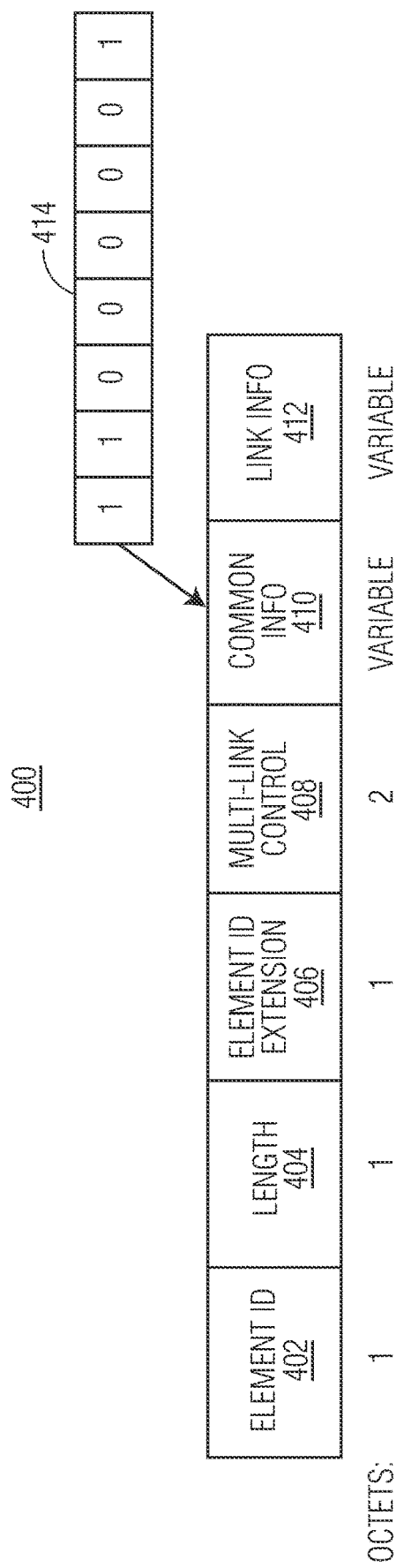
FIG. 4A depicts a Multi-Link Information Element (IE).

FIG. 4A depicts a Multi-Link IE 400. In the embodiment of FIG. 4A, the Multi-Link IE 400 includes six fields, implemented as an Element ID field 402 (1 octet), a Length field 404 (1 octet), an Element ID Extension field 406 (1 octet), a Multi-Link Control field 408 (2 octets), a Common Info field 410 (variable octets), and a Link Info field 412 (variable octets). The link Info field 412 may include Per-STA Profile subelements.

In some embodiments, the Multi-Link Control field 408 indicates a BSSID Index bitmap size of bitmaps in indications (e.g., indications 312-3a, 312-3b, and/or 312-3n of TIM element 300-2, or indications 312-3a, 312-3b, and 312-3c of TIM element 300-3) included in a third subfield (e.g., third subfield 312-3) of a TIM element (e.g., TIM element 300-2 or 300-3). In such an embodiment, a value of zero in the Multi-Link Control field 408 would indicate that there is no inclusion of a BSSID Index bitmap, and a value of n indicates that there is a BSSID Index bitmap with $2^n$ bits (n is a positive integer). In some embodiments, the Common Info field 410 includes an 8-bit BSSID Index bitmap 414.

The Common Info field 410 includes the 8-bit BSSID Index bitmap 414 if an 8-bit BSSID Index bitmap is not included in a TIM element and the Multi-Link Control field indicates that a BSSID Index bitmap is present.

An example of a Multi-Link Control field included in a Multi-Link IE is described in further detail with reference to FIG. 4B.

Figure 4B:
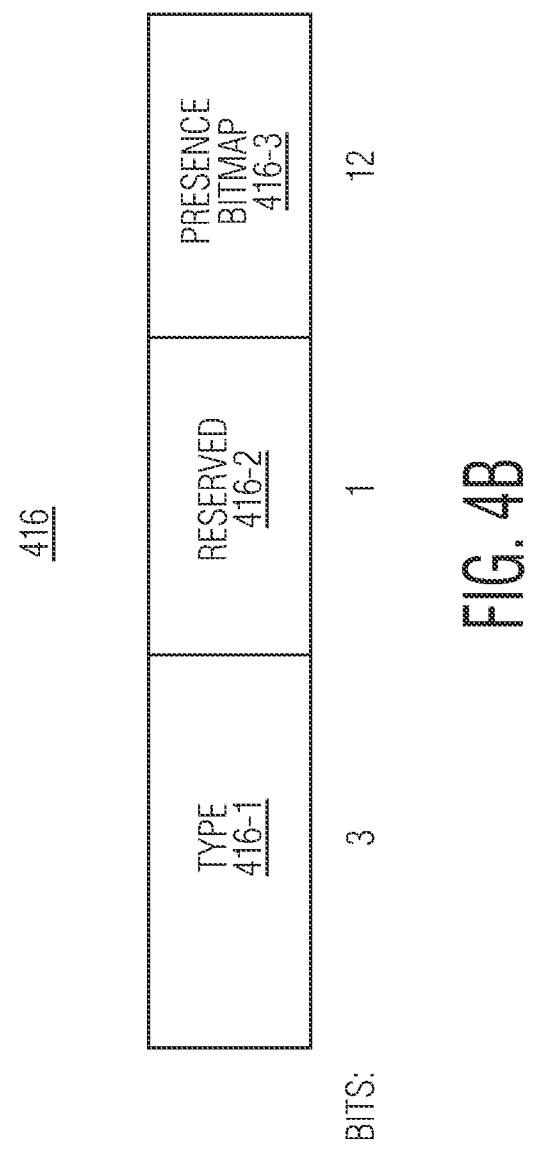
FIG. 4B depicts a Multi-Link Control field.

FIG. 4B depicts a Multi-Link Control field 416. The Multi-Link Control field 416 can represent the Multi-Link Control field 408 of the Multi-Link IE 400 of FIG. 4A. In the embodiment of FIG. 4B, the Multi-Link Control field 416 includes three subfields implemented as a Type subfield 416-1 (3 bits), a Reserved subfield 416-2 (1 bit), and a Presence Bitmap subfield 416-3 (12 bits).

An example of a Per-STA Profile subelement that may be included in a Link Info field of a Multi-Link IE is described in further detail with reference to FIG. 4C.

Figure 4C:
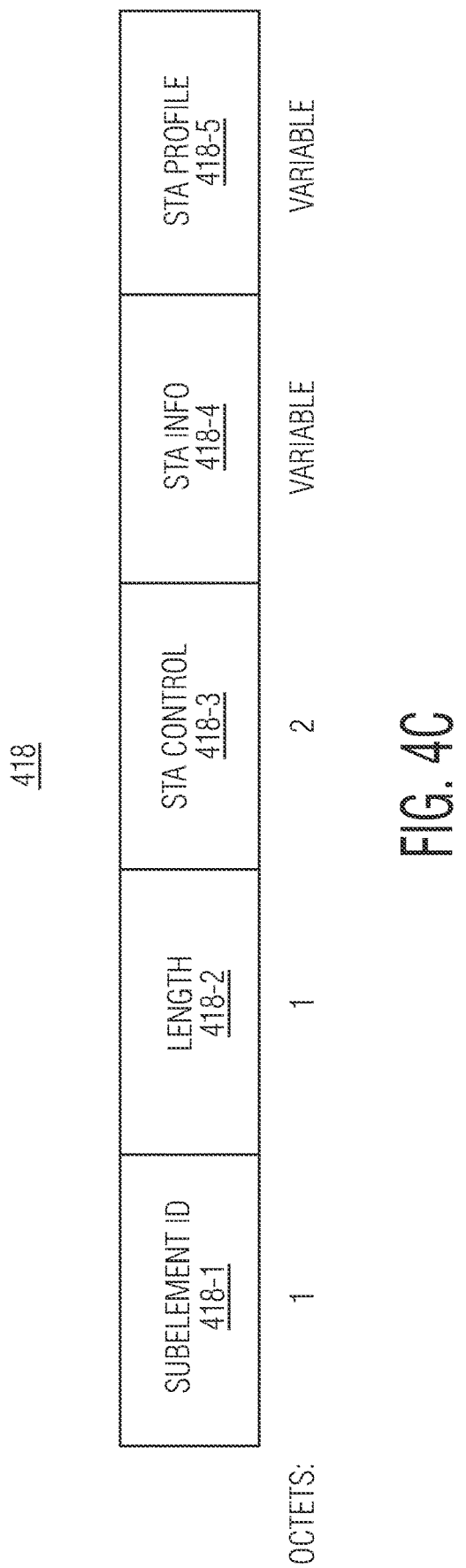
FIG. 4C depicts a Per-Station (STA) Profile subelement.

FIG. 4C depicts a Per-STA Profile subelement 418. The Per-STA Profile subelement 418 may be included in the Link Info field 412 of the Multi-Link IE 400 of FIG. 4A. In the embodiment of FIG. 4C, the Per-STA Profile subelement 418 includes five fields implemented as a Subelement ID field 418-1 (1 octet), a Length field 418-2 (1 octet), an STA Control field 418-3 (2 octets), an STA Info field 418-4 (variable octets), and an STA Profile field 418-5 (variable octets).

In some embodiments, each AP of an AP MLD may have a unique AID value. In such an embodiment, AID values allocated to APs may not overlap with AID values allocated to non-transmitted BSSIDs (e.g., in any link), and the AID value of each AP of an AP MLD may be explicitly announced (e.g., via a Multi-Link IE or a TIM element). In some embodiments, AID values allocated to STAs that do not support multi-link operation are smaller (e.g., less) than AID values allocated to other STAs affiliated with non-AP MLDs.

In some embodiments, a bitmap of a group-addressed buffered frame indication for reported APs of AP MLDs are treated (e.g., transmitted, received, and/or processed) the same as a bitmap of an individual-addressed buffered frame indication. As an example, if a reporting AP does not support a multiple BSSID feature or the reporting AP is identified by a transmitted BSSID, then reported APs are affiliated with the same AP MLD as the reporting AP that transmits a frame (e.g., a Beacon frame) that includes the buffered frame indication(s). As another example, if the reporting AP has a transmitted BSSID, then the reported APs are either affiliated with the same AP MLD as the reporting AP, or affiliated with AP MLDs of the APs with a non-transmitted BSSID (related to the reporting AP).

In some embodiments, a Partial Virtual Bitmap field (e.g., Partial Virtual Bitmap field 312) does not include an indication of group-addressed buffered frames for a reported AP of an AP MLD if a minimal AID in the Partial Virtual Bitmap field indicated by a Bitmap Offset subfield (e.g., Bitmap Offset subfield 214-2) is larger an AID allocated to a reported AP. In some embodiments, a part, or a whole bitmap of a group-addressed buffered frame indication for reported APs of AP MLDs can be ignored (e.g., bypassed, not read, and/or not processed) from a Partial Virtual Bitmap field (e.g., Partial Virtual Bitmap field 312). For example, a non-AP MLD ignores the group-addressed buffered frame indication from a Partial Virtual Bitmap field of the TIM element if the reported APs that STAs and non-AP MLDs are associated with do not have the buffered frames and a Bitmap Offset subfield (e.g., Bitmap Offset subfield 214-2), the Bitmap Offset subfield and a Length field (e.g., Length field 204) describe the ignoring, AIDs of the reported APs are smaller than a smallest AID value described by the Partial Virtual Bitmap field, and/or AIDs of the reported APs are larger than a largest AID value described by the Partial Virtual Bitmap field.

In one embodiment, AID values of APs affiliated with AP MLDs may be announced via a Multi-Link IE (e.g., Multi-Link IE 400) included in Beacon frames. In another embodiment, when a non-AP MLD establishes a multi-link association with an AP MLD, the AP MLD announces an AID value for APs with which the non-AP MLD establishes the multi-link association. In such embodiments, a Presence Bitmap subfield (e.g., Presence Bitmap subfield 416-3) included in a Common Info field of a basic variant Multi-Link IE indicates whether the Common Info field includes an AID of an AP that transmits a management frame that includes the Multi-Link IE (e.g., from the reporting AP), such that the Common Info field may optionally include an AID of the reporting AP. Additionally, an STA Control field (e.g., STA Control field 418-3) included in a Per-STA Profile subelement of a link in a Link Info field (e.g., Link Info field 412) may indicate whether an STA Info field (e.g., STA Info field 418-4) includes an AID of a reported AP of the link, such that the STA Info field optionally includes an AID of the link.

In some embodiments, an AP MLD may need to indicate to a non-AP MLD, a buffered frame with a TID at the AP MLD if the TID is not mapped to a link which is included in a link set accepted by the AP MLD for multi-link association with the non-AP MLD, and may set a bit in a Partial Virtual Bitmap field of a TIM element that corresponds to an AID of the non-AP MLD to a value of one. If at least one associated non-AP MLD has successfully negotiated TID-to-link mapping with the AP MLD and the AP MLD has buffered frames for the non-AP MLD, then the AP may carry a Multi-Link Traffic IE. As an example, for a non-AP MLD with negotiated TID-to-link mapping, a Multi-Link Traffic IE indicates links that there are buffered frames for. As another example, for a non-AP MLD with default TID-to-link mapping, a Multi-Link Traffic IE indicates recommended links that the non-AP MLD should use to acquire buffered frames.

In some embodiments, there may be two types of TID-to-link mapping that a non-AP MLD can negotiate with. A first type of TID-to-link mapping may be that all TIDs are mapped to a same link set. A second type of TID-to-link mapping may be that different TIDs can be mapped to different links. In some embodiments, management frames not used for measurement can be mapped to all links. Consequently, with TIDs being mapped to the same negotiated link set for a non-AP MLD, an indication of links with buffered frames in a Multi-Link Traffic IE for the non-AP MLD does not give useful information. Additionally, if an AP MLD has a management buffered frame for a non-AP MLD whose TIDs can be mapped to different links, the Multi-Link Traffic IE indicates buffered frames for (all) links of the non-AP MLD.

In an embodiment, if at least one associated non-AP MLD has successfully negotiated TID-to-link mapping with an AP MLD, where the non-AP MLD supports different TIDs being mapped to different links through negotiation, and the AP MLD has a buffered frame for the non-AP MLD, then an AP of the AP MLD may be required to (or shall) include a Multi-Link Traffic IE in a Beacon frame and in a broadcast frame (e.g., TIM Broadcast frame, other broadcast frame, or individual-addressed frame to the non-AP MLD) if transmitted by an AP of a non-AP MLD. For example, a Beacon frame includes a Multi-link Traffic IE if at least one associated non-AP MLD with negotiated TID-to-link mapping (where different TIDs are mapped to different links) is associated with a device (e.g., an AP MLD), and the device has buffered frames for the non-AP MLD. For a non-AP MLD that supports different TIDs being mapped to different links through negotiation, the Multi-Link Traffic IE indicates links that the buffered frames are for. For a non-AP MLD with default TID-to-link mapping, the Multi-Link Traffic IE indicates recommended links that the non-AP MLD should use to acquire the buffered frames. For a non-AP MLD with TID-to-link mapping where TIDs are mapped to a same negotiated link set, the Multi-Link Traffic IE indicates recommended links that the non-AP MLD should use to acquire the buffered frames.

In another embodiment, if at least one associated non-AP MLD has successfully negotiated TID-to-link mapping where different TIDs are mapped to different links and an AP MLD has buffered frames for the non-AP MLD, then an AP of the AP MLD may be required to include a Multi-Link Traffic IE in a Beacon frame and in a broadcast frame (e.g., TIM Broadcast frame, other broadcast frame, or individual-addressed frame to the non-AP MLD) if transmitted by an AP of a non-AP MLD. For example, a Beacon frame includes a Multi-link Traffic IE if at least one associated non-AP MLD with negotiated TID-to-link mapping is associated with the device, where different TIDs are mapped to the different links, and the device has buffered frames for the non-AP MLD. For a non-AP MLD with negotiated TID-to-link mapping where different TIDs are mapped to different links, the Multi-Link Traffic IE indicates links that the buffered frames are for. For a non-AP MLD with default TID-to-link mapping, the Multi-Link Traffic IE indicates recommended links that the non-AP MLD should use to acquire the buffered frames. For a non-AP MLD with TID-to-link mapping where TIDs are mapped to a same negotiated link set, the Multi-Link Traffic IE indicates recommended links that the non-AP MLD should use to acquire the buffered frames.

In yet another embodiment, if there are no buffered frames at an AP MLD for (all) associated non-AP MLDs that successfully negotiated TID-to-link mapping where different TIDs are mapped to different links, then an AP of the AP MLD optionally includes a Multi-Link Traffic IE in a Beacon frame and in a broadcast frame (e.g., TIM Broadcast frame, other broadcast frame, or individual-addressed frame to the non-AP MLD) if transmitted by an AP of non-AP MLD. For example, a Beacon frame may include a Multi-link Traffic IE if there are no buffered frames at the AP MLD for all the associated non-AP MLDs that successfully negotiated TID-to-link mapping where different TIDs are mapped to different links. For a non-AP MLD with default TID-to-link mapping, the Multi-Link Traffic IE indicates recommended links that the non-AP MLD should use to acquire the buffered frames. For a non-AP MLD with TID-to-link mapping where TIDs are mapped to a same negotiated link set, the Multi-Link Traffic IE indicates recommended links that the non-AP MLD should use to acquire the buffered frames.

In yet another embodiment, if at least one associated non-AP MLD has successfully negotiated TID-to-link mapping, where different TIDs are mapped to different links and an AP MLD has buffered frames for the non-AP MLD, then an AP of the AP MLD may be required to include a Multi-Link Traffic IE in a Beacon frame and in a broadcast frame (e.g., TIM Broadcast frame, other broadcast frame, or individual-addressed frame to the non-AP MLD) if transmitted by an AP of a non-AP MLD. In such an embodiment, the Multi-Link Traffic IE indicates, for each non-AP MLD with negotiated TID-to-link mapping, links that include buffered Quality of Service (QoS) Data frames.

In some embodiments, if buffered frames for a non-AP MLD with negotiated TID-to-link mapping where different TIDs are mapped to different links include Management frames and QoS Data frames, then the Multi-Link Traffic IE indicates, for the non-AP MLD with negotiated TID-to-link mapping, links that include buffered QoS Data frames. If buffered frames for a non-AP MLD with negotiated TID-to-link mapping where different TIDs are mapped to different links include QoS Data frames only, then the Multi-Link Traffic IE indicates, for the non-AP MLD with negotiated TID-to-link mapping, links that include buffered QoS Data frames. If the buffered frames for a non-AP MLD with negotiated TID-to-link mapping where different TIDs are mapped to different links include Management frames only, then the Multi-Link Traffic IE indicates, for the non-AP MLD with negotiated TID-to-link mapping, links that include the Management frames. The Multi-Link Traffic IE indicates whether a link includes a buffered frame using one bit (e.g., one bit included in the Multi-Link Traffic IE).

In one embodiment, a frame includes a Multi-link Traffic IE that includes a link ID bitmap for a non-AP MLD when a link bitmap has a length different from sixteen. In such an embodiment, the link ID bitmap includes a first bit that corresponds to a link that has an AP with a smallest link ID value, a last bit that corresponds to another link that has another AP with a largest link ID value, a link ID value that is related to a bit that is less than another link ID value related to another bit that is after the bit, and if a number of bits in the link ID bitmap is more than a number of links of a device (e.g., an AP MLD), then least significant bit (LSB) bits related to the number of the links with APs of the device are used. In another embodiment, when a link bitmap has a length of sixteen, a link ID bitmap has an i-th bit that is related to a link with link ID i (i is a positive integer).

In one embodiment, a length of a link ID bitmap for a non-AP MLD (e.g., each non-AP MLD) is the same as a number of links of the non-AP MLD with a maximal number of setup (association) links. As an example, the maximal number of links for (all) associated non-AP MLDs is equal to three, so the length of the link ID bitmap for each non-AP MLD is three. When a non-AP MLD has two links (e.g., link three and link five), a first bit of a link ID bitmap for the non-AP MLD is for link three, a second bit of the link ID bitmap for the non-AP MLD is for link five, and a third bit of the link ID bitmap for the non-AP MLD is not used (reserved). In one embodiment, a length of a link ID bitmap for a non-AP MLD (e.g., each non-AP MLD) is the same as a maximal Link ID value (or the maximal Link ID value+1 if the smallest Link ID value is 0) of (all) associated non-AP MLDs. As an example, if the maximal Link ID value of all associated non-AP MLDs is seven, then the length of the link ID bitmap for each non-AP MLD is eight. The i bit (where i is no less than zero and no more than seven) in the link ID bitmap is for a link with Link ID i.

An example of a TIM bitmap and a set of Link Mapping Bitmap (LMB) is described in further detail with reference to FIG. 5.

Figure 5:
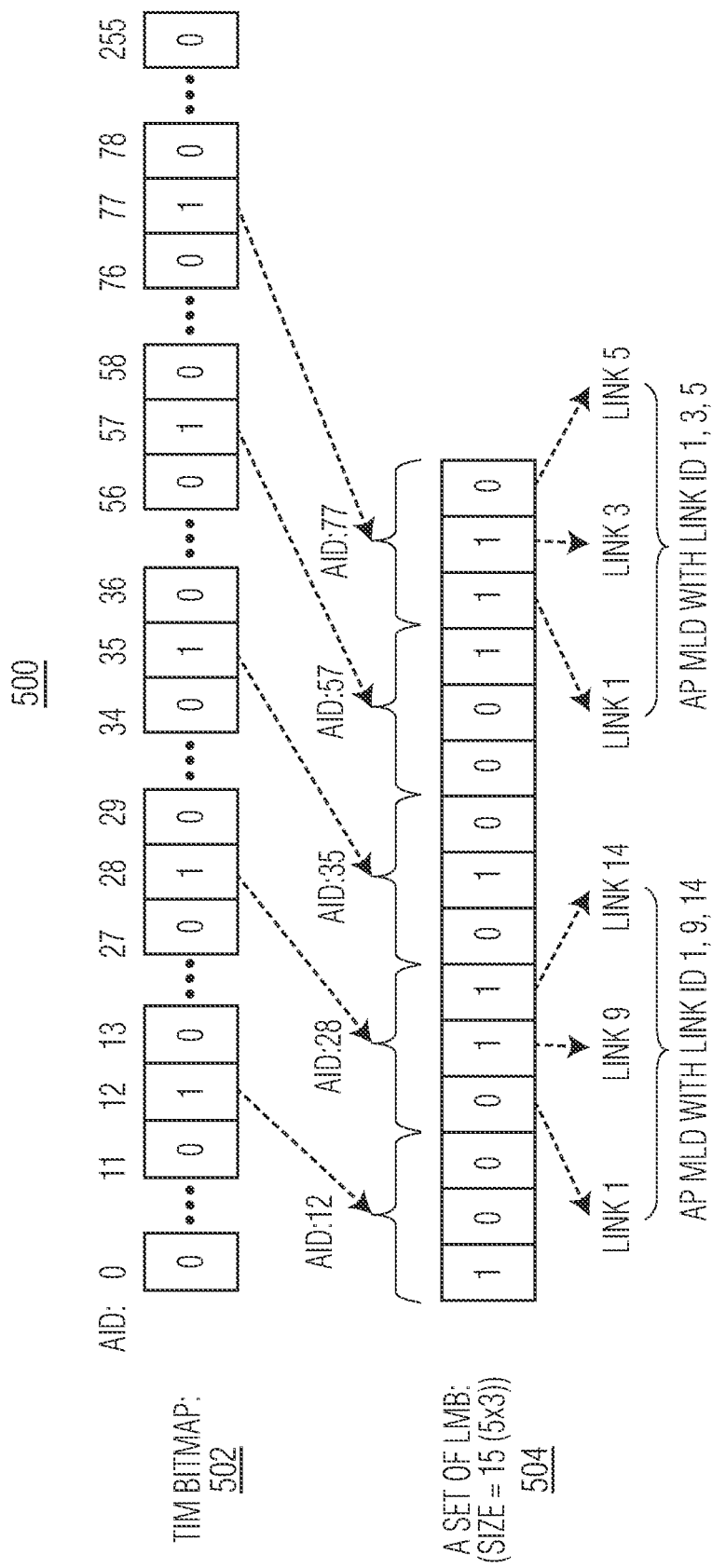
FIG. 5 depicts a TIM bitmap and a set of Link Mapping Bitmap (LMB).

FIG. 5 depicts a TIM bitmap, 502, and a set of LMB, 504. In an embodiment, the set of LMB has a size of fifteen (5×3). In the embodiment of FIG. 5, the TIM bitmap 502 corresponds to AID values, such that the AID values range from 0 to 255. When the TIM bitmap 502 has a one, the TIM bitmap indicates the corresponding AID value for that bit (e.g., an AID value of 12, 28, 35, 57, and 77 as shown in FIG. 5). Links that the AID values correspond to are indicated by the set of LMB 504, such that the link(s) that the AID values correspond to are indicated by a one. For example, "AID: 28" corresponds to link nine and link fourteen, and "AID: 77" corresponds to link one and link three.

Figure 6:
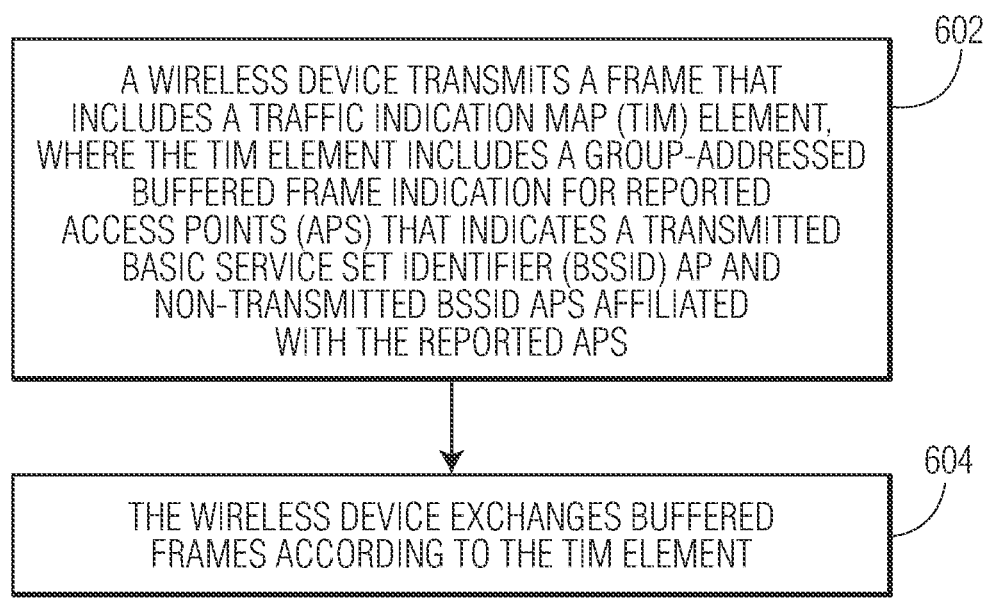
FIG. 6 illustrates a flow diagram of a technique for multi-link operations in accordance with an embodiment of the invention.

FIG. 6 illustrates a flow diagram of a technique for multi-link operations in accordance with an embodiment of the invention. At block 602, a wireless device transmits a frame that includes a TIM element, where the TIM element includes a group-addressed buffered frame indication for reported APs that indicates a transmitted BSSID AP and non-transmitted BSSID APs affiliated with the reported APs. At block 604, the wireless device exchanges buffered frames according to the TIM element.

In some embodiments, the technique for multi-link operations may be implemented by a device (e.g., an AP of an AP MLD). For example, a device may include a processor configured to generate a frame that includes a TIM element, where the TIM element includes a group-addressed buffered frame indication for reported APs that indicates a transmitted BSSID AP and non-transmitted BSSID APs affiliated with the reported APs, and exchange buffered frames according to the TIM element. In some embodiments, "generate a frame" may imply assembling, creating, organizing, and/or preparing a frame to be transmitted.

In some embodiments, the technique for multi-link operations may be implemented by a system. For example, a system includes a first MLD (e.g., AP MLD), where the first MLD includes a processor configured to generate a frame that includes a TIM element, where the TIM element includes a group-addressed buffered frame indication for reported APs that indicates a transmitted BSSID AP and non-transmitted BSSID APs affiliated with the reported APs, and a radio configured to transmit the frame that includes the TIM element. In such an example, the system also includes a second MLD (e.g., a non-AP MLD), where the second MLD includes another radio configured to receive the frame that includes the TIM element.

Figure 7:
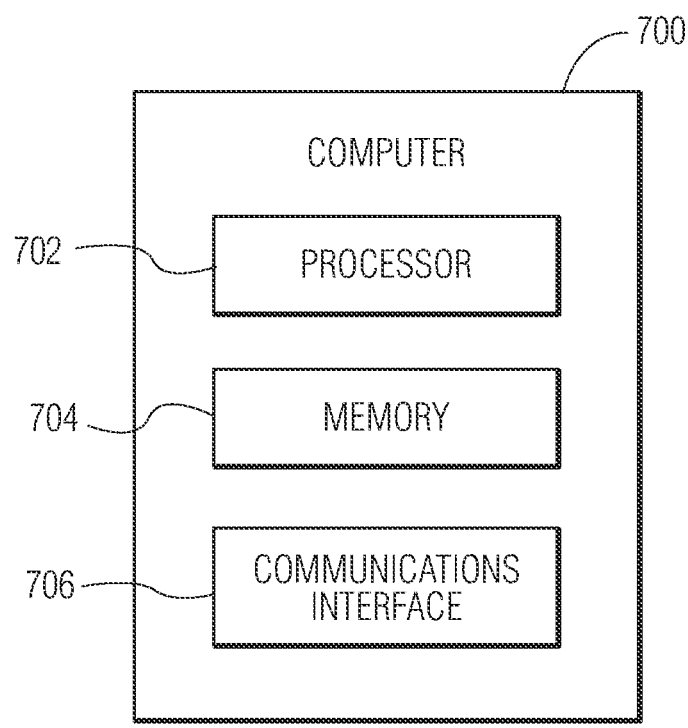
FIG. 7 depicts an example of a computer that can implement the technique for multi-link operations as described with reference to FIG. 6.

In an embodiment, the above-described functionality is performed at least in part by a computer or computers, which executes computer readable instructions. FIG. 7 depicts an example of a computer 700 that can implement the technique for multi-link operations as described herein with reference to FIG. 6. As shown, the computer 700 includes a processor 702, a memory 704, and a communications interface 706. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above. As an example, the computer 700 may represent a device (e.g., an AP, an AP MLD, a non-AP STA, or a non-AP STA MLD).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, an RAM, an ROM, a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
 a processor configured to:
  generate a frame that includes a Traffic Indication Map (TIM) element, wherein the TIM element includes a group-addressed buffered frame indication for reported Access Points (APs) that indicates a transmitted Basic Service Set Identifier (BSSID) AP and non-transmitted BSSID APs affiliated with the reported APs; and
  exchange buffered frames according to the TIM element;
 wherein a length of bitmaps included in the group-addressed buffered frame indication is indicated in a Multi-Link Control field of a Multi-Link IE.

2. The device of claim 1, wherein a bitmap per BSSID Index included in a Multi-Link Information Element (IE) indicates whether the TIM element includes the group-addressed buffered frame indication for the reported APs with a non-transmitted BSSID Index; and
 wherein bitmaps of AP Multi-Link Devices (MLDs) have a same length that is indicated in the Multi-Link IE.

3. The device of claim 2, wherein the bitmap per BSSID Index is included in a Common Info field of the Multi-Link IE, and wherein the length is indicated in a Multi-Link Control field of the Multi-Link IE.

4. The device of claim 1, wherein a bitmap of the group-addressed buffered frame indication is after a bitmap of an individual-addressed buffered frame indication.

5. The device of claim 4, wherein an ending of the bitmap of the individual-addressed buffered frame indication is indicated by an N2 field; and
 wherein non-AP MLDs with an Association Identifier (AID) value related to a bit at a location more than (N2+1)*8 do not have bits for individual-addressed buffered frame indications.

6. The device of claim 1, wherein a bitmap of the group-addressed buffered frame indication for a non-transmitted BSSID AP with a BSSID Index is excluded from a Partial Virtual Bitmap field of the TIM element if at least one of:
 the bitmap includes all zero bits;
 the BSSID Index does not correspond to the non-transmitted BSSID; and
 the bitmap related to the BSSID Index has zero bits for a larger BSSID Index.

7. The device of claim 1, wherein a bitmap per BSSID Index included in the TIM element indicates whether the TIM element includes the group-addressed buffered frame indication for the reported APs with a non-transmitted BSSID Index; and
 wherein bitmaps of AP MLDs have a same length that is indicated in a Multi-Link IE.

8. The device of claim 1, wherein a non-AP MLD ignores the group-addressed buffered frame indication from a Partial Virtual Bitmap field of the TIM element if at least one of:
 the reported APs that Stations (STAs) of the non-AP MLD are associated with do not have the buffered frames and a Bitmap Offset subfield;
 the Bitmap Offset subfield and a Length field describe the ignoring;
 AIDs of the reported APs are smaller than a smallest AID value described by the Partial Virtual Bitmap field; and
 AIDs of the reported APs are larger than a largest AID value described by the Partial Virtual Bitmap field.

9. The device of claim 1, wherein the device allocates smaller AID values to STAs that do not support multi-link operation than AID values allocated to other STAs affiliated with non-AP MLDs.

10. The device of claim 1, wherein an AID value of the reported APs is announced in a Multi-Link IE of Beacon frames.

11. The device of claim 1, wherein when the device establishes a multi-link association with a non-AP MLD, the device announces an AID value for APs with which the non-AP MLD establishes a connection.

12. The device of claim 1, wherein the frame includes a Multi-link Traffic IE that indicates Traffic Identifiers (TIDs) mapped to different links.

13. The device of claim 1, wherein the frame includes a Multi-link Traffic IE if at least one associated non-AP MLD with negotiated TID-to-link mapping is associated with the device, and the device has the buffered frames for the non-AP MLD; and
 wherein the Multi-link Traffic IE is included in a Beacon frame and in a Broadcast frame if transmitted by an AP of the at least one associated non-AP MLD.

14. The device of claim 1, wherein the frame includes a Multi-link Traffic IE if at least one associated non-AP MLD with negotiated TID-to-link mapping is associated with the device, wherein different TIDs are mapped to the different links, and the device has the buffered frames for the non-AP MLD; and
 wherein the Multi-link Traffic IE is included in a Beacon frame and in a broadcast frame if transmitted by an AP of the at least one associated non-AP MLD.

15. The device of claim 1, wherein the frame optionally includes a Multi-link Traffic IE if at least one associated non-AP MLD with negotiated TID-to-link mapping is associated with the device, wherein different TIDs are mapped to the different links, and the device does not have the buffered frames for the non-AP MLD; and wherein the Multi-link Traffic IE is optionally included in a Beacon frame and in a broadcast frame if transmitted by an AP of the at least one associated non-AP MLD.

16. The device of claim 1, wherein the frame includes a Multi-link Traffic IE that indicates, for each non-AP MLD with negotiated TID-to-link mapping, links that include the buffered frames.

17. The device of claim 1, wherein the frame includes a Multi-link Traffic IE that includes a link ID bitmap when a link bitmap has a length different from sixteen, and wherein the link ID bitmap includes:
   a first bit that corresponds to a link that has an AP with a smallest link ID value;
   a last bit that corresponds to another link that has another AP with a largest link ID value;
   a link ID value that is related to a bit that is less than another link ID value related to another bit that is after the bit; and
   if a number of bits in the link ID bitmap is more than a number of links of the device, then least significant bit (LSB) bits related to the number of the links with APs of the device are used.

18. A device comprising:
a processor configured to:
   generate a frame that includes a Traffic Indication Map (TIM) element, wherein the TIM element includes a group-addressed buffered frame indication for reported Access Points (APs) that indicates a transmitted Basic Service Set Identifier (BSSID) AP and non-transmitted BSSID APs affiliated with the reported APs; and
   exchange buffered frames according to the TIM element;
   wherein an AID value of the reported APs is announced in a Multi-Link IE of Beacon frames.

19. A device comprising:
a processor configured to:
   generate a frame that includes a Traffic Indication Map (TIM) element, wherein the TIM element includes a group-addressed buffered frame indication for reported Access Points (APs) that indicates a transmitted Basic Service Set Identifier BSSID) AP and non-transmitted BSSID APs affiliated with the reported APs; and
   exchange buffered frames according to the TIM element;
   wherein the frame includes a Multi-link Traffic IE that indicates Traffic Identifiers (TIDs) mapped to different links.

* * * * *